US012631256B2

(12) United States Patent
Updike

(10) Patent No.: US 12,631,256 B2
(45) Date of Patent: May 19, 2026

(54) OVER-MOLDED COMPRESSION LIMITER

(71) Applicant: GM Global Technology Operations LLC, Detroit, MI (US)

(72) Inventor: Kevin Updike, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 18/514,070

(22) Filed: Nov. 20, 2023

(65) Prior Publication Data

US 2025/0164010 A1 May 22, 2025

(51) Int. Cl.
*F16J 15/12* (2006.01)
*F16J 15/10* (2006.01)

(52) U.S. Cl.
CPC ........... *F16J 15/127* (2013.01); *F16J 15/104* (2013.01); *F16J 15/122* (2013.01)

(58) Field of Classification Search
CPC ........ F16J 15/104; F16J 15/121; F16J 15/122; F16J 15/127; F16J 15/0818
See application file for complete search history.

(56) References Cited

U.S. PATENT DOCUMENTS

| | | | | |
|---|---|---|---|---|
| 5,979,906 | A | * 11/1999 | Silvian | F16J 15/0825 277/593 |
| 2010/0109256 | A1 | * 5/2010 | Goettler | F16J 15/0818 277/592 |
| 2018/0241019 | A1 | 8/2018 | Iqbal et al. | |
| 2020/0086811 | A1 | 3/2020 | Boulton et al. | |

* cited by examiner

*Primary Examiner* — Christine M Mills
*Assistant Examiner* — L. Susmitha Koneru
(74) *Attorney, Agent, or Firm* — Honigman LLP; Matthew H. Szalach; Jonathan P. O'Brien

(57) ABSTRACT

A system including a part including a top surface defining a top slot and a bottom surface defining a bottom slot, the top slot and the bottom slot each permitting access from opposite directions to a first central cavity passing through the entire part, and a compression limiter over-molded to the part, the compression limiter including an upper portion defining an upper slot that coincides with the top slot and a lower portion defining a lower slot that coincides with the bottom slot, the upper slot and the lower slot each permitting access from opposite directions to a second central cavity that coincides with the first central cavity.

20 Claims, 5 Drawing Sheets

OVER-MOLDED COMPRESSION LIMITER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to over-molded compression limiters. Specifically, the compression limiters described herein may be used to provide and maintain bolted joint integrity of an assembly. The compression limiters may be designed to protect the components of an assembly from the compressive loads generated when a bolt is tightened to its recommended tightening torque, thereby assuring that the joint remains intact throughout the life of the assembly.

Single-use compression limiters are expensive due to the material costs and tooling associated with replacing the compression limiter after a single use. Accordingly, there is room for improvement in compression limiters.

SUMMARY

One aspect of the disclosure provides a system for a vehicle including a part having a top surface defining a top slot and a bottom surface defining a bottom slot, the top slot and the bottom slot each permitting access from opposite directions to a first central cavity passing through the entire part. The system also includes a compression limiter over-molded to the part and including an upper portion having a U-shape and a lower portion having a U-shape, the upper portion defining an upper slot that coincides with the top slot and the lower portion defining a lower slot that coincides with the bottom slot, the upper slot and the lower slot each permitting access from opposite directions to a second central cavity that coincides with the first central cavity.

Implementations of the disclosure may include one or more of the following optional features. In some implementations, the compression limiter is formed of a thermoplastic elastomer.

The part may be formed of one of a plastic or a metal.

The compression limiter may be configured to receive a fastener. The fastener may be a bolt.

The upper portion of the compression limiter may include a curved portion connected to two legs extending in a parallel direction away from the curved portion. The lower portion of the compression limiter may include a curved portion connected to two legs extending in a parallel direction away from the curved portion. The upper portion and the lower portion of the compression limiter may be substantially identical in size, shape, and material.

Another aspect of the disclosure provides a system including a part having a top surface defining a top slot and a bottom surface defining a bottom slot, the top slot and the bottom slot each permitting access from opposite directions to a first central cavity passing through the entire part. The system also includes a compression limiter over-molded to the part, the compression limiter including an upper portion defining an upper slot that coincides with the top slot and a lower portion defining a lower slot that coincides with the bottom slot, the upper slot and the lower slot each permitting access from opposite directions to a second central cavity that coincides with the first central cavity.

Implementations of the disclosure may include one or more of the following optional features. In some implementations, the compression limiter is formed of a thermoplastic elastomer.

The part may be formed of one of a plastic or a metal.

The compression limiter may be configured to receive a fastener. The fastener may be a bolt.

The upper portion of the compression limiter may include a curved portion connected to two legs extending in a parallel direction away from the curved portion. The lower portion of the compression limiter may include a curved portion connected to two legs extending in a parallel direction away from the curved portion. The upper portion and the lower portion of the compression limiter may be substantially identical in size, shape, and material.

Another aspect of the disclosure provides a compression limiter for over-molding to a part, the compression limiter including an upper portion having a U-shape, the upper portion defining an upper slot, a lower portion having a U-shape, the lower portion defining a lower slot, the upper slot and the lower slot each permitting access from opposite directions to a central cavity that extends throughout the compression limiter.

Implementations of the disclosure may include one or more of the following optional features. In some implementations, the compression limiter is formed of a thermoplastic elastomer.

The part may be formed of one of a plastic or a metal.

The compression limiter may be configured to receive a bolt.

The details of one or more implementations of the disclosure are set forth in the accompanying drawings and description below. Other aspects, features, and advantages will be apparent from the description, drawings, and claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
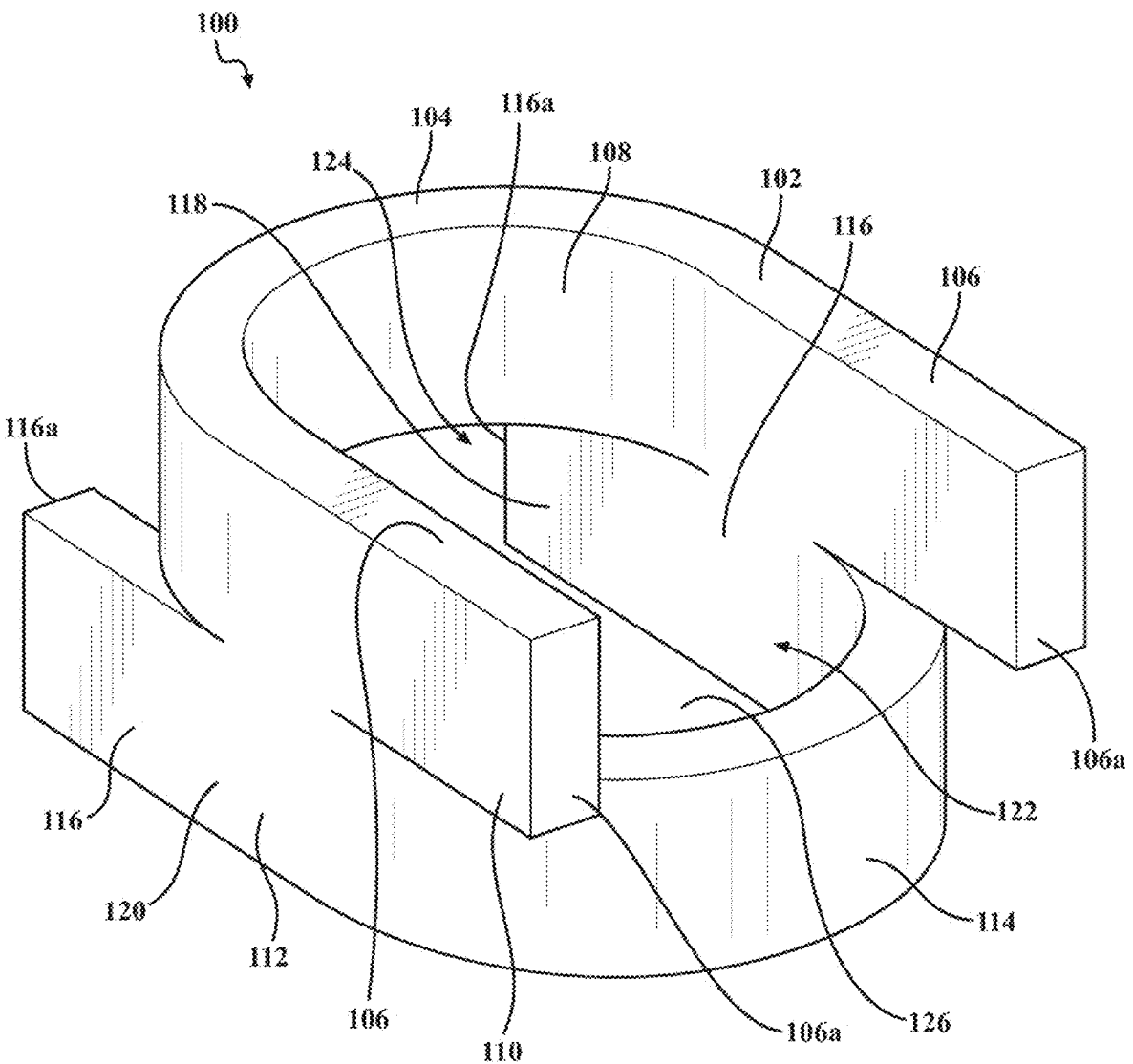
FIG. 1A is a perspective view of an exemplary compression limiter, in accordance with the present disclosure.
Figures 1B, 1C:
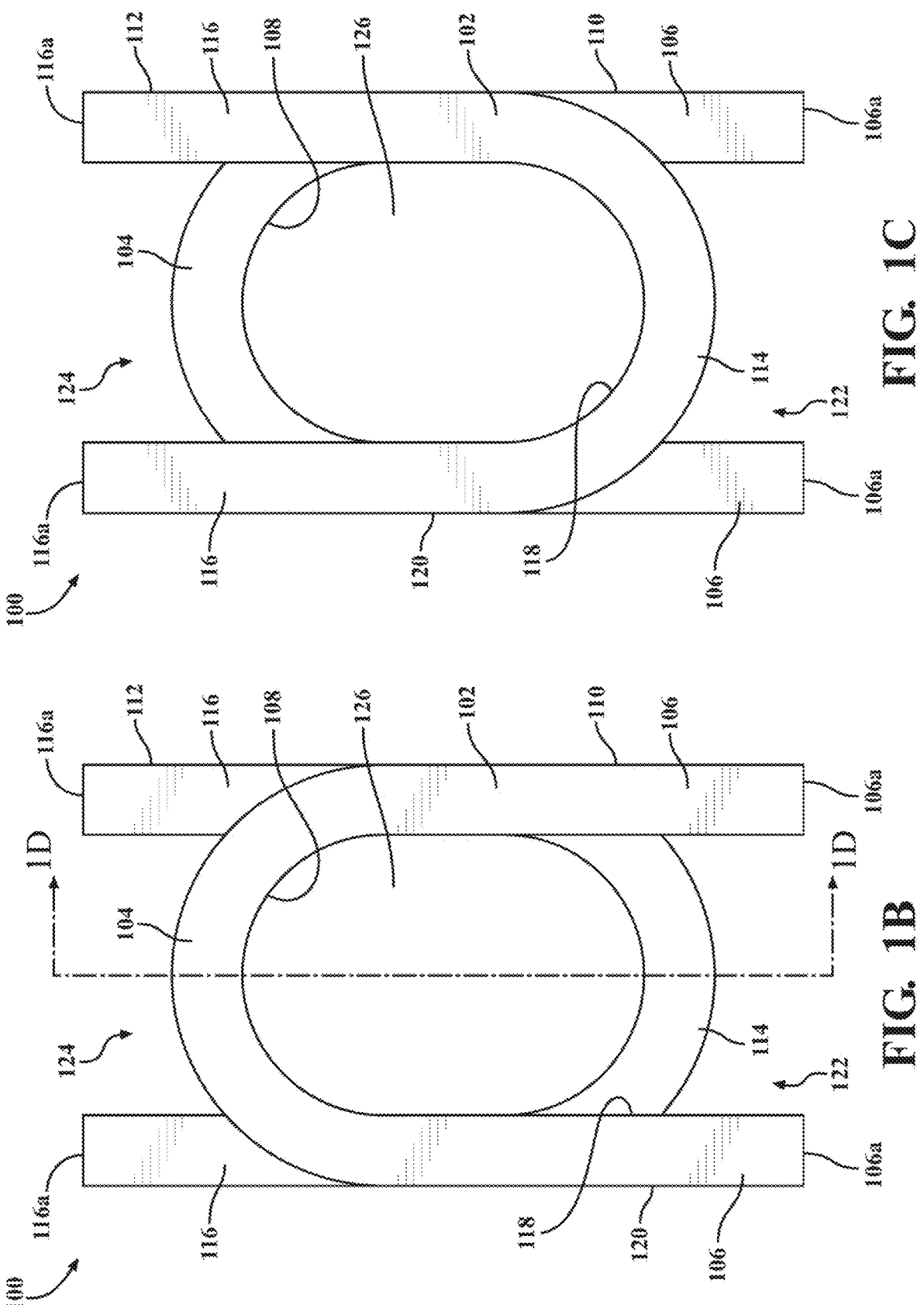
FIG. 1B is a top plan view of the exemplary compression limiter of FIG. 1A.
FIG. 1C is a bottom plan view of the exemplary compression limiter of FIG. 1A.
Figure 1D:
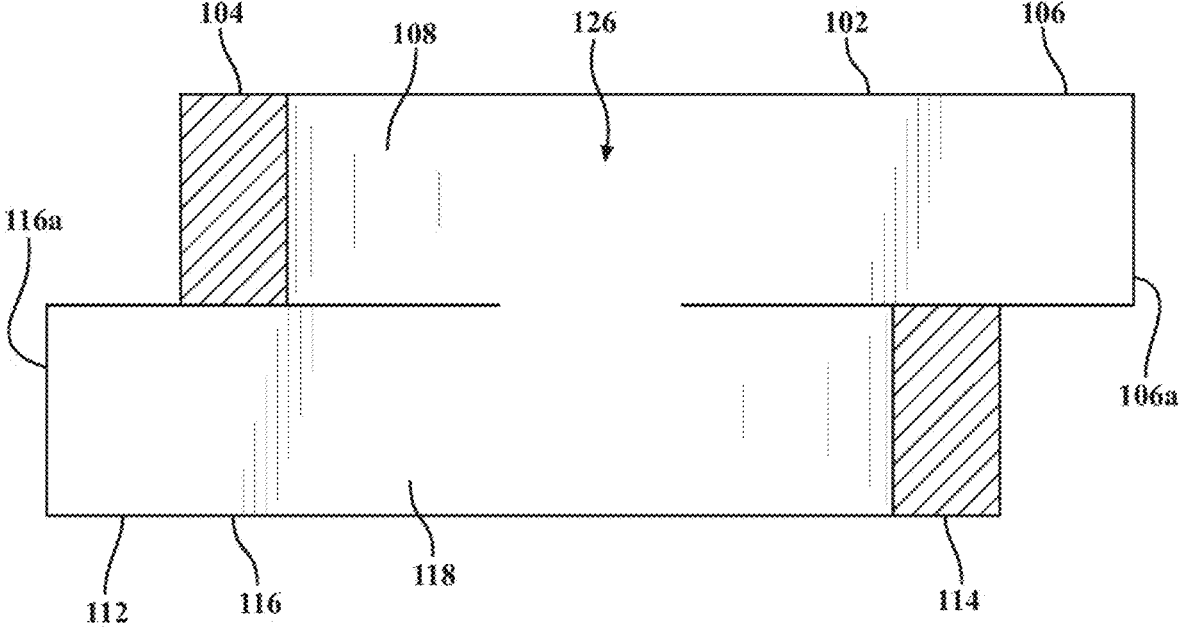
FIG. 1D is a cross-sectional view of the exemplary compression limiter of FIG. 1A, taken along line 1D-1D in FIG. 1B.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIGS. 1A-1D, a compression limiter 100 is generally shown. The compression limiter 100 may be used to provide and maintain bolted joint integrity of a plastic assembly or part, such as exemplary part 200 shown in FIGS. 2-3. The compression limiter 100 is over-molded with the part 200, as described in greater detail below.

The compression limiter 100 may include an upper portion 102 that is generally U-shaped. The upper portion 102 includes a curved section 104 connected to two legs 106 extending away from the curved section 104 in a generally parallel configuration. The curved section 104 and the legs 106 may be integrally formed with each other. Each leg 106 includes a distal surface 106a. The upper portion 102 defines an interior surface 108 and an exterior surface 110. That is, the interior surface 108 of one of the legs 106 faces the interior surface 108 of the opposite leg 106.

The compression limiter 100 may include a lower portion 112 that is generally U-shaped and integrally formed with the upper portion 112. The lower portion 112 may be substantially identical to the upper portion 102 in shape, size, and material. The upper portion 112 includes a curved section 114 connected to two legs 116 extending away from the curved section 114 in a generally parallel configuration. The curved section 114 and the legs 116 may be integrally formed with each other. Each leg 116 includes a distal surface 116a. The upper portion 112 defines an interior surface 118 and an exterior surface 120. That is, the interior surface 118 of one of the legs 116 faces the interior surface 118 of the opposite leg 116.

The legs 106 of the upper portion 102 define an upper slot 122 and the legs 116 of the lower portion 112 define a lower slot 124. The slots 122, 124 permit access from opposite directions to a central cavity 126 defined by the curved sections 104, 114 and portions of the legs 106, 116. As shown, the legs 106 of the upper portion 102 extend in an opposite direction than the legs 116 of the lower portion 112 such that the legs 106, 116 extend away from one another. Further, a distance between the legs 106 and a distance between the legs 116 may be substantially equal and, further, may include substantially the same length. Finally, the central cavity 126 may be generally cylindrical such as the substantially oval shapes shown in FIGS. 1B and 1C.

Figure 2:
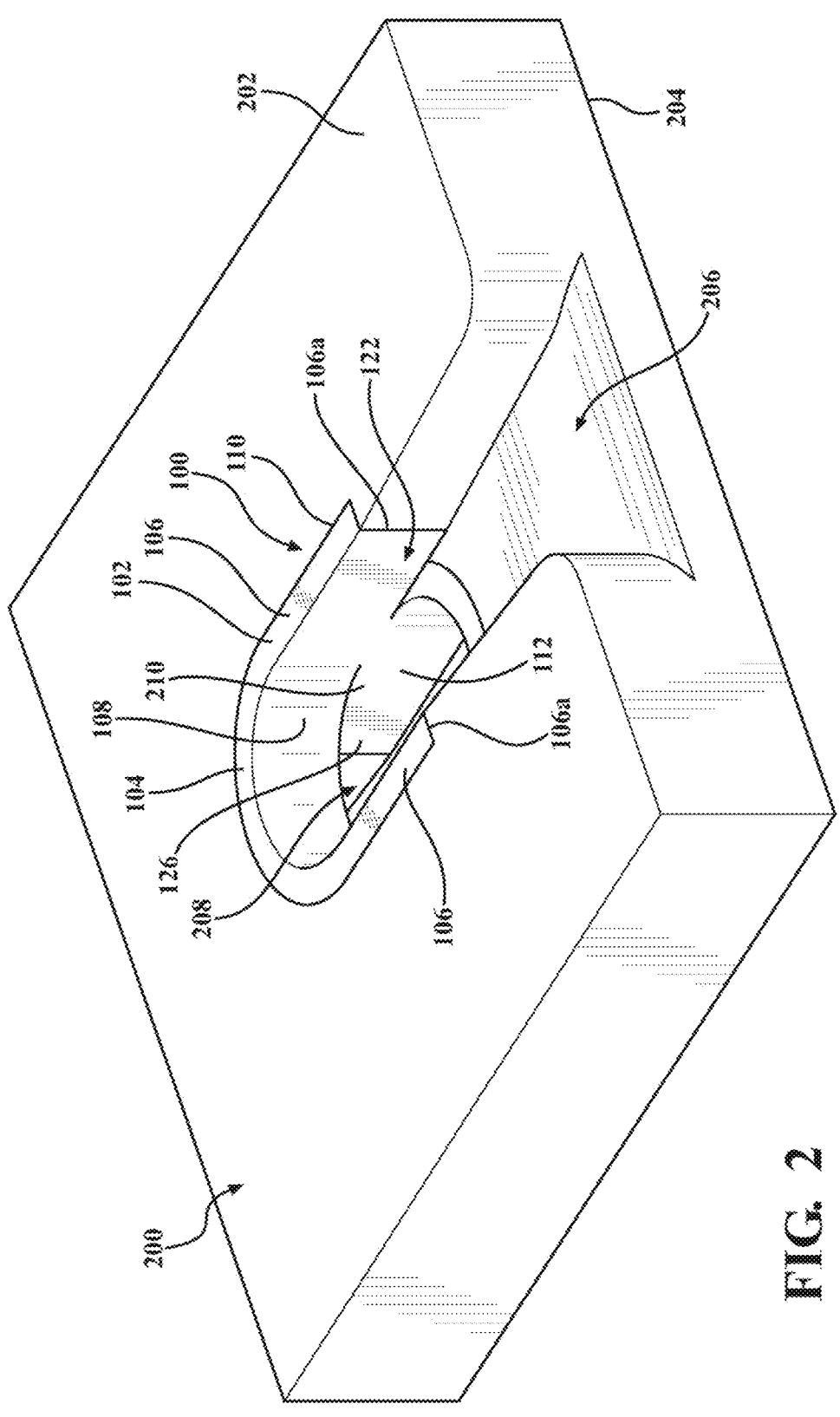
FIG. 2 is a perspective view of the exemplary compression limiter of FIG. 1A over-molded with an exemplary part.

Referring to FIG. 2, an exemplary part 200 is generally shown including the compression limiter 100 over-molded to the part 200. The part 200 may be for any suitable application, such as a part for a vehicle or automobile. The compression limiter 100 may be injection molded and formed of a pliable, rubber-like material, such as a thermoplastic elastomer (TPE), or any other suitable material. The part 200 may be manufactured by a molding process with the compression limiter 100 inserted into an injection molding press. In such a configuration, the part 200 is formed around the compression limiter 100. Thus, the finished product of the part 200—including the compression limiter 100 over-molded to the part 200—is completed in a single step, rather than requiring the compression limiter 100 to be secured to the part 200 after the part 200 is molded. Such a process also eliminates the need for additional actions, such as slides, being incorporated into the injection molding press.

The part 200 includes a top surface 202 and a bottom surface 204 opposite the top surface 202. The top surface 202 defines a top slot 206 that coincides with the upper slot 122. The bottom surface 204 defines a bottom slot 208 that coincides with the lower slot 124. The slots 206, 208 permit access from opposite directions to a central cavity 210 of the part 200. The central cavity 200 coincides with the central cavity 126 of the compression limiter 100. The part 200 may be formed of any suitable material, such as a plastic, metal, etc.

Figure 3:
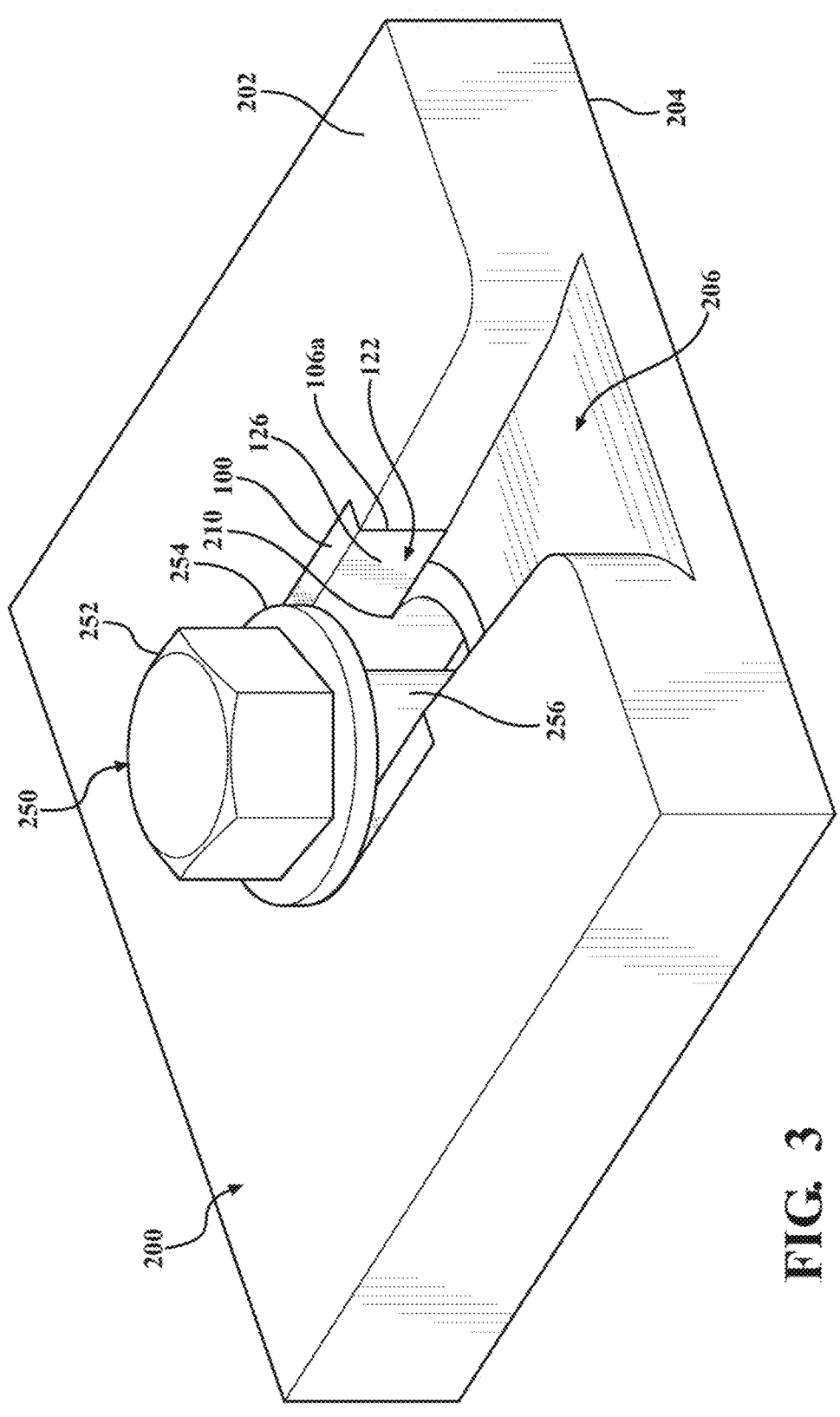
FIG. 3 is a perspective view of the exemplary compression limiter of FIG. 1A over-molded with an exemplary part including an exemplary bolt.

Referring to FIG. 3, the part 200 may receive a fastener 250, which may be a bolt or any other suitable fastening means. The fastener 250 may include a head 252, a collar 254, and a shaft 256. The head 252 may receive a tool to torque the fastener 250. The collar 254 may be have a diameter larger than a diameter of the central cavity 126, such that the collar 254 rests on top of the upper portion 102 of the compression limiter 100. The shaft 256 may have a diameter less than a diameter of the central cavity 126, such that the shaft 256 extends through the central cavity 126. The fastener 250 may include a nut (not shown) or any other suitable component to secure the fastener 250 to the part

200. In such configurations, the nut may be disposed directly adjacent to the lower portion 112 of the compression limiter 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for a vehicle comprising:
a part including a top surface defining a top slot and a bottom surface defining a bottom slot, the top slot and the bottom slot each permitting access from opposite directions to a first central cavity passing through the entire part; and
a compression limiter over-molded to the part, the compression limiter including an upper portion having a U-shape and a lower portion having a U-shape, the upper portion defining an upper slot that coincides with the top slot and the lower portion defining a lower slot that coincides with the bottom slot, the upper slot and the lower slot each permitting access from opposite directions to a second central cavity that coincides with the first central cavity,
wherein the upper portion of the compression limiter includes a curved portion connected to two legs extending in a parallel direction away from the curved portion, the lower portion of the compression limiter includes a curved portion connected to two legs extending in a parallel direction away from the curved portion, and the two legs of the upper portion extend away from the two legs of the lower portion.

2. The system of claim 1, wherein the compression limiter is formed of a thermoplastic elastomer.

3. The system of claim 1, wherein the part is formed of one of a plastic or a metal.

4. The system of claim 1, wherein the compression limiter is configured to receive a fastener.

5. The system of claim 4, wherein the fastener is a bolt.

6. The system of claim 1, wherein the upper portion and the lower portion of the compression limiter are substantially identical in size, shape, and material.

7. The system of claim 1, wherein the two legs of the upper portion are the same length as the two legs of the lower portion.

8. The system of claim 1, wherein the distance between the two legs of the upper portion is the same as the distance between the two legs of the lower portion.

9. A system comprising:
a part including a top surface defining a top slot and a bottom surface defining a bottom slot, the top slot and the bottom slot each permitting access from opposite directions to a first central cavity passing through the entire part; and
a compression limiter over-molded to the part, the compression limiter including an upper portion defining an upper slot that coincides with the top slot and a lower portion defining a lower slot that coincides with the bottom slot, the upper slot and the lower slot each permitting access from opposite directions to a second central cavity that coincides with the first central cavity,
wherein the upper portion of the compression limiter includes a curved portion connected to two legs extending in a parallel direction away from the curved portion, the lower portion of the compression limiter includes a curved portion connected to two legs extending in a parallel direction away from the curved portion, and the two legs of the upper portion extend away from the two legs of the lower portion.

10. The system of claim 9, wherein the compression limiter is formed of a thermoplastic elastomer.

11. The system of claim 9, wherein the part is formed of one of a plastic or a metal.

12. The system of claim 9, wherein the compression limiter is configured to receive a fastener.

13. The system of claim 12, wherein the fastener is a bolt.

14. The system of claim 9, wherein the upper portion and the lower portion of the compression limiter are substantially identical in size, shape, and material.

15. The system of claim 9, wherein the two legs of the upper portion are the same length as the two legs of the lower portion.

16. The system of claim 9, wherein the distance between the two legs of the upper portion is the same as the distance between the two legs of the lower portion.

17. A compression limiter for over-molding to a part, the compression limiter comprising:
an upper portion having a U-shape, the upper portion defining an upper slot; and
a lower portion having a U-shape, the lower portion defining a lower slot, the upper slot and the lower slot each permitting access from opposite directions to a central cavity that extends throughout the compression limiter,
wherein the upper portion of the compression limiter includes a curved portion connected to two legs extending in a parallel direction away from the curved portion, the lower portion of the compression limiter includes a curved portion connected to two legs extending in a parallel direction away from the curved portion, and the two legs of the upper portion extend away from the two legs of the lower portion.

18. The compression limiter of claim 17, wherein the compression limiter is formed of a thermoplastic elastomer.

19. The compression limiter of claim 17, wherein the part is formed of one of a plastic or a metal.

20. The compression limiter of claim 17, wherein the compression limiter is configured to receive a bolt.

* * * * *